US012763435B2

(12) United States Patent
Xi et al.

(10) Patent No.: US 12,763,435 B2
(45) Date of Patent: Oct. 13, 2026

(54) CELL STACK SUPPORT FOR A VEHICLE BATTERY CELL

(71) Applicant: GM Global Technology Operations LLC, Detroit, MI (US)

(72) Inventors: Liang Xi, Northville, MI (US); Fengkun Wang, Rochester Hills, MI (US); Lei Wang, Rochester Hills, MI (US); SriLakshmi Katar, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 628 days.

(21) Appl. No.: 18/335,521

(22) Filed: Jun. 15, 2023

(65) Prior Publication Data

US 2024/0421436 A1 Dec. 19, 2024

(51) Int. Cl.

| | |
|---|---|
| ***H01M 50/477*** | (2021.01) |
| ***B60K 1/04*** | (2019.01) |
| ***B60L 50/64*** | (2019.01) |
| ***H01M 50/103*** | (2021.01) |
| ***H01M 50/367*** | (2021.01) |
| ***H01M 50/474*** | (2021.01) |
| ***H01M 50/486*** | (2021.01) |

(52) U.S. Cl.

CPC ............. *H01M 50/477* (2021.01); *B60K 1/04* (2013.01); *B60L 50/64* (2019.02); *H01M 50/103* (2021.01); *H01M 50/367* (2021.01); *H01M 50/474* (2021.01); *H01M 50/486* (2021.01); *H01M 2220/20* (2013.01)

(58) Field of Classification Search

CPC ............. H01M 50/477; H01M 50/103; H01M 50/367; H01M 50/474; H01M 50/486; H01M 2220/20; H01M 50/209; H01M 50/358; H01M 10/613; H01M 10/625; H01M 10/6556; H01M 10/6561; B60K 1/04; B60L 50/64; Y02E 60/10

See application file for complete search history.

(56) References Cited

U.S. PATENT DOCUMENTS

| | | | | |
|---|---|---|---|---|
| 2015/0072175 A1* | 3/2015 | DeKeuster | ............. | B60L 50/64 429/7 |
| 2020/0303701 A1* | 9/2020 | Kim | .................. | H01M 50/3425 |

* cited by examiner

*Primary Examiner* — Daniel H Lee
(74) *Attorney, Agent, or Firm* — CANTOR COLBURN LLP

(57) ABSTRACT

A battery cell for a vehicle includes a cell can having a first wall, a second wall, a first side wall and a second side wall. The first wall, the second wall, the first side wall, and the second side wall defining an electrode stack receiving zone. A vent formed in the second wall. The vent fluidically connects the electrode stack receiving zone with an exterior of the cell can. An electrode stack is positioned in the electrode stack receiving zone. The electrode stack is spaced from of the first side wall by a channel. The cell can includes a plurality of raised ribs formed in the second wall. Each of the plurality of raised ribs includes a support surface. The electrode stack rests on the support surface in the electrode stack receiving zone.

20 Claims, 2 Drawing Sheets

CELL STACK SUPPORT FOR A VEHICLE BATTERY CELL

INTRODUCTION

The subject disclosure relates to the art of rechargeable energy storage systems and, more particularly, to a cell stack support for a rechargeable vehicle battery system.

Rechargeable energy storage systems (RESS) typically include one or more battery packs having rechargeable energy storage cells. The battery pack is connectable to an external charging system that replenishes electrical energy lost to a load. The charging system may be part of a vehicle, or may be part of an external charging station. When providing power to a vehicle, the battery pack discharges stored electrical energy. Replenishing and discharging the stored electrical energy results in gas generation that is vented from the battery pack.

There is a wide array of systems employed to vent batteries. For example, many batteries will include spacers arranged between a bottom surface of a cell can and an electrode stack. The spacer is typically formed from a heat resistant material. The spacer creates channels in the bottom surface that guide gases to a vent. While existing systems are effective, current spacers limit gas flow and thereby constrict ventilation. Accordingly, the art would welcome a spacer that is more open to gas flow so as to reduce restrictions in ventilation flow.

SUMMARY

A battery cell for a vehicle, in accordance with a non-limiting example, includes a cell can having a first wall, a second wall disposed opposite the first wall, a first side wall extending between and connecting the first wall with the second wall, and a second side wall, positioned opposite the first side wall extending between and connecting the first wall with the second wall. The first wall, the second wall, the first side wall, and the second side wall define an electrode stack receiving zone. A vent formed in the second wall. The vent is spaced from the first side wall and the second side wall. The vent fluidically connects the electrode stack receiving zone with an exterior of the cell can. An electrode stack is positioned in the electrode stack receiving zone. The electrode stack is spaced from of the first side wall by a channel. The cell can includes a plurality of raised ribs formed in the second wall. Each of the plurality of raised ribs includes a support surface. The electrode stack rests on the support surface in the electrode stack receiving zone.

In addition to one or more of the features described herein the plurality of raised ribs includes a first plurality of ribs formed in the second wall and extending between the first side wall and the vent and a second plurality of ribs formed in the second wall between the second side wall and the vent.

In addition to one or more of the features described herein each of the plurality of raised ribs includes a rectangular cross-section.

In addition to one or more of the features described herein each of the plurality of raised ribs includes a circular cross-section.

In addition to one or more of the features described herein each of the plurality of raised ribs includes a plurality of raised bumps formed in the second wall.

In addition to one or more of the features described herein a plurality of passages extend between the first side wall and the vent, the plurality of passages being formed from the plurality of raised ribs.

In addition to one or more of the features described herein a channel extends between the electrode stack and the first side wall, the channel being fluidically connected with the plurality of passages.

In addition to one or more of the features described herein the plurality of passages includes a first plurality of passages extending between the first side wall and the vent and a second plurality of passages extending substantially perpendicularly to the first plurality of passages.

In addition to one or more of the features described herein the plurality of raised ribs includes a first plurality of ribs formed in the second wall establishing a first plurality of passages extending between the first side wall and the vent and a second plurality of ribs formed in the second wall establishing a second plurality of passages extending between the second side wall and the vent.

In addition to one or more of the features described herein a plastic support member is arranged between the electrode stack and the support surface.

A vehicle, in accordance with a non-limiting example, includes a body, an electric motor supported in the body, and a battery pack supported in the body and connected to the electric motor. The battery pack including a battery cell having a cell can including a first wall, a second wall disposed opposite the first wall, a first side wall extending between and connecting the first wall with the second wall, and a second side wall, positioned opposite the first side wall extending between and connecting the first wall with the second wall, the first wall, the second wall. The first side wall, and the second side wall define an electrode stack receiving zone. A vent is formed in the second wall. The vent is spaced from the first side wall and the second side wall. The vent fluidically connects the electrode stack receiving zone with an exterior of the cell can. An electrode stack positioned in the electrode stack receiving zone. The electrode stack is spaced from of the first side wall by a channel. The cell can includes a plurality of raised ribs formed in the second wall. Each of the plurality of raised ribs includes a support surface. The electrode stack rests on the support surface in the electrode stack receiving zone.

In addition to one or more of the features described herein the plurality of raised ribs includes a first plurality of ribs formed in the second wall and extending between the first side wall and the vent and a second plurality of ribs formed in the second wall between the second side wall and the vent.

In addition to one or more of the features described herein each of the plurality of raised ribs includes a rectangular cross-section.

In addition to one or more of the features described herein each of the plurality of raised ribs includes a circular cross-section.

In addition to one or more of the features described herein each of the plurality of raised ribs includes a plurality of raised bumps formed in the second wall.

In addition to one or more of the features described herein a plurality of passages extend between the first side wall and the vent, the plurality of passages being formed from the plurality of raised ribs.

In addition to one or more of the features described herein a channel extending between the electrode stack and the first side wall, the channel being fluidically connected with the plurality of passages.

In addition to one or more of the features described herein the plurality of passages includes a first plurality of passages extending between the first side wall and the vent and a second plurality of passages extending substantially perpendicularly to the first plurality of passages.

In addition to one or more of the features described herein the plurality of raised ribs includes a first plurality of ribs formed in the second wall establishing a first plurality of passages extending between the first side wall and the vent and a second plurality of ribs formed in the second wall establishing a second plurality of passages extending between the second side wall and the vent.

In addition to one or more of the features described herein a plastic support member arranged between the electrode stack and the support surface.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
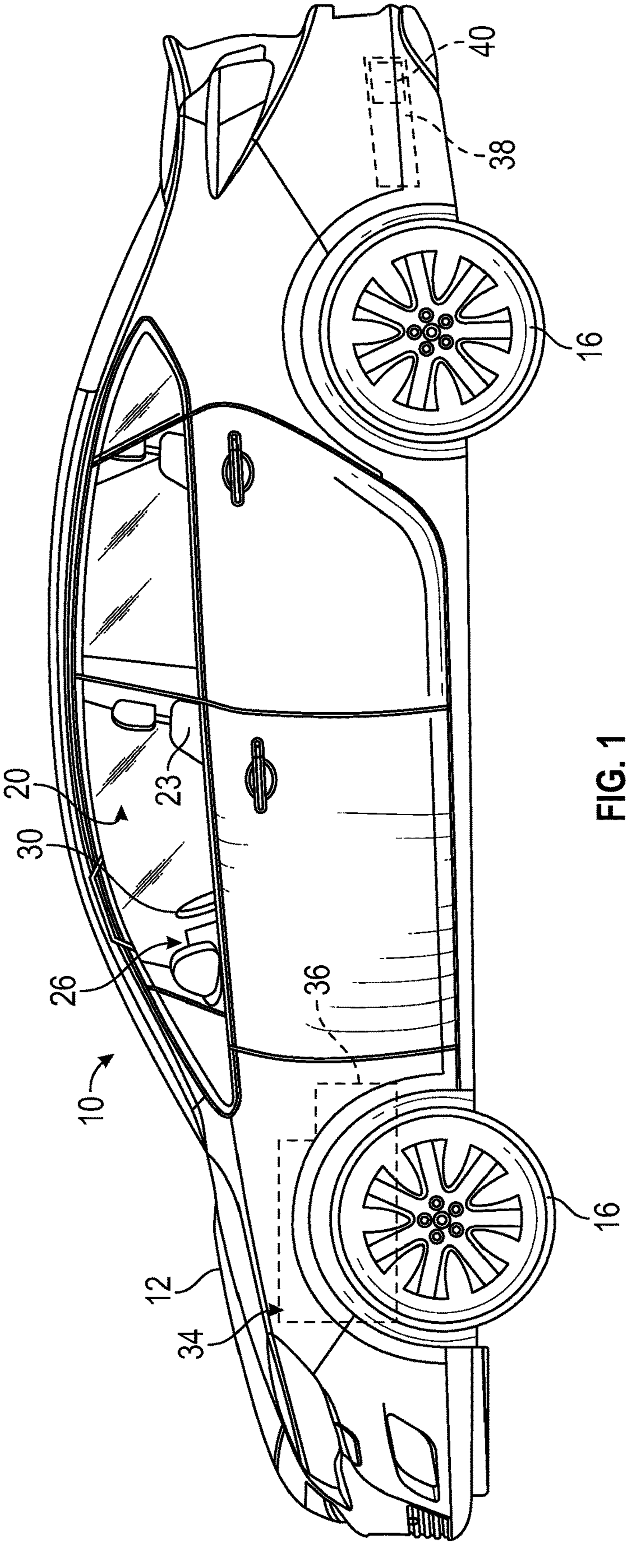
FIG. 1 is a left side view of a vehicle including a battery pack having a cell stack support, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. One or more of the plurality of wheels 16 are steerable. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s).

Figure 3:
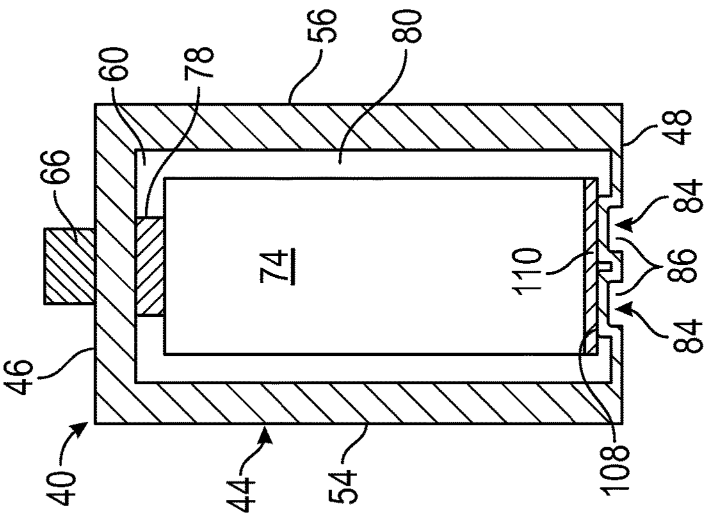
FIG. 3 is a cross-sectional end view of the battery cell of FIG. 2, in accordance with a non-limiting example.
Figure 2:
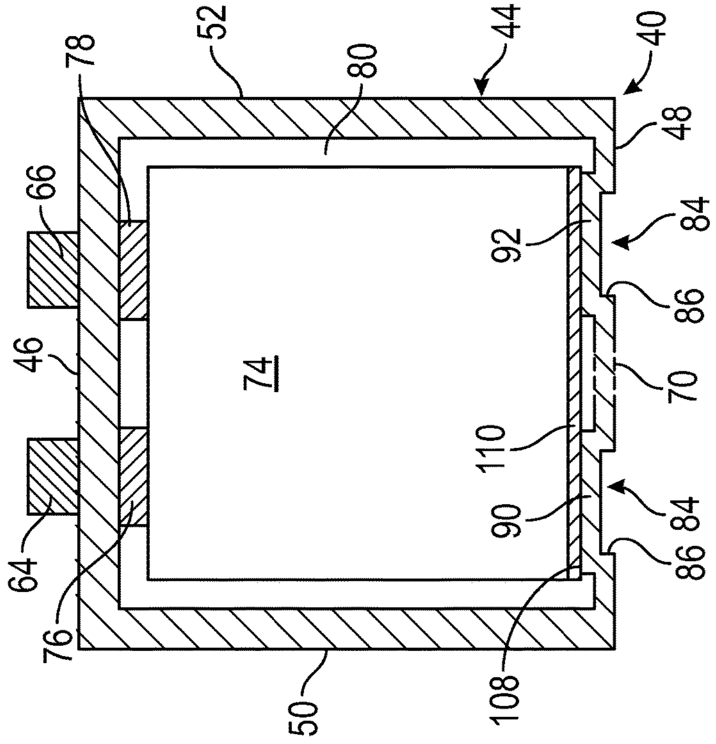
FIG. 2 is a cross-sectional side view of the battery pack having battery cell including a cell stack support, in accordance with a non-limiting example.

Vehicle 10 includes an electric motor 34 connected to a transmission 36 that provides power to one or more of the plurality of wheels 16. A rechargeable energy storage system (RESS) 38 is arranged in body 12 and provides power to electric motor 34. At this point, it should be understood that the location of electric motor 34, transmission 36, and RESS 38 in body 12 may vary. RESS 38 has a battery pack 40 that includes a plurality of cell cans 44 one of which is shown in FIGS. 2 and 3. At this point, it should be understood that battery pack 40 includes a plurality of battery modules (not shown) each formed from a plurality of battery cells (also not shown) having a cell can 44.

In a non-limiting example, cell can 44 includes a first wall 46 and a second wall 48. A plurality of side walls including a first side wall 50, a second side wall 52, a third side wall 54 (FIG. 3), and a fourth side wall 56 (FIG. 3) extend between and connect first wall 46 and second wall 48. First wall 46, second wall 48, and side walls 50, 52, 54, and 56 define an electrode stack receiving zone 60. In the non-limiting example shown, first wall 46 is a top wall that supports a first terminal 64 and a second terminal 66. First terminal 64 and second terminal 66 electrically connect to an exterior load, such as electric motor 34. Second wall 48, in the non-limiting example shown, defines a bottom wall and includes a vent 70.

In a non-limiting example, an electrode stack 74 is arranged in electrode stack receiving zone 60. Electrode stack 74 stores and releases electrical energy through first terminal 64 and second terminal 66 to, for example, electric motor 34. Toward that end, a first tab 76 and a second tab 78 provide an electrical interface between electrode stack 74 and corresponding ones of first terminal 64 and second terminal 66. In a non-limiting example, a channel 80 extends about electrode stack 74. Channel 80 provides a pathway for gases that may be generated by electrode stack 74 during charging and/or discharging. The gases may pass along channel 80 and escape cell can 44 through vent 70.

In a non-limiting example, cell can 44 includes a plurality of raised ribs 84 that support electrode stack 74. Raised ribs 84 take the form of indentations 86 formed in second wall 48. In a non-limiting example shown in FIG. 4, plurality of raised ribs 84 includes a first plurality of ribs 90 extending between first side wall 50 and vent 70 and a second plurality of ribs 92 extending between second side wall 52 and vent 70. In this non-limiting arrangement, vent 70 is centrally positioned between first plurality of ribs 90 and second plurality of ribs 92.

In a non-limiting example, first plurality of ribs 90 are spaced from another, and from third side wall 54 and fourth side wall 56 by a first plurality of passages 94. Similarly, second plurality of ribs 92 are spaced from another, and from third side wall 54 and fourth side wall 56 by a second plurality of passages 96. First plurality of passages 94 and second plurality of passages 96 direct gases passing from electrode stack 74 into channel 80 to vent 70. The number of ribs and passages may vary.

Figure 4:
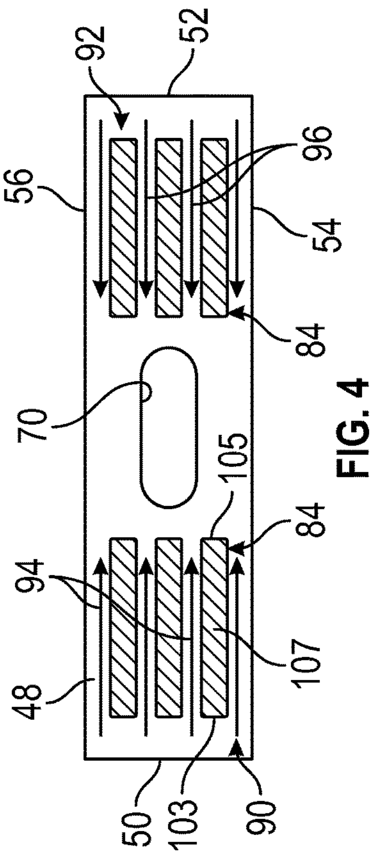
FIG. 4 is a top view of the battery cell of FIG. 2 including cell stack supports, in accordance with a non-limiting example.

Reference will continue to FIG. 4 in describing one of the first plurality of ribs 90 with an understanding that remaining ones of the first plurality of ribs as well as the second plurality of ribs 92 include corresponding structure. Each of the first plurality of ribs 90 includes a generally rectangular cross-section and has a first end 103 spaced from first side wall 50 and a second end 105 that is spaced from vent 70. An intermediate portion (not separately labeled) having a support surface 108 (FIG. 2) extends between first end 103 and second end 105.

In a non-limiting example, electrode stack 74 is supported on support surface 108 in electrode stack receiving zone 60. In a non-limiting example, a plastic sheet 110 is arranged on support surface 108. Plastic sheet 110 includes a planar surface (not separately labeled) that eliminates stress concentrations that may occur when electrode stack 74 is supported directly on the plurality of raised ribs 84. The raised ribs 84 provide a platform that lifts electrode stack 74 from second wall 48 to provide clear pathways that allow gases that may develop in cell can 44 to vent to ambient.

Figure 5:
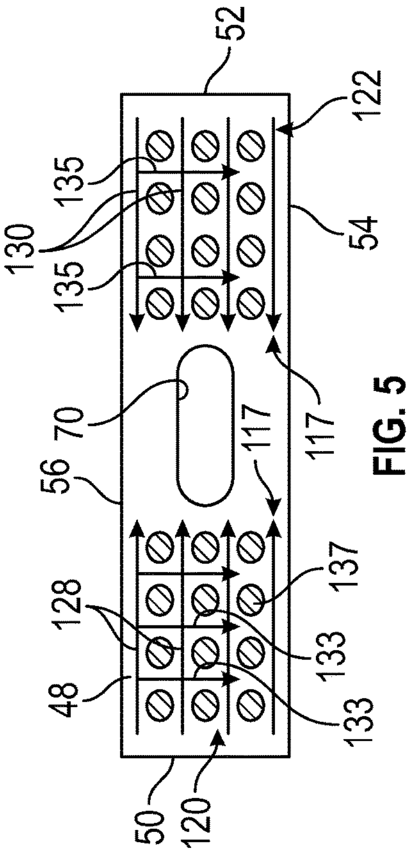
FIG. 5 is a top view of a battery cell including cell stack supports, in accordance with another non-limiting example.

Reference will now follow to FIG. 5 in describing a plurality of raised ribs 117 in accordance with another exemplary aspect. The number, shape, and arrangement of raised ribs 117 may vary. Raised ribs 117 take the form of indentations formed in second wall 48. Raised ribs 117 include a first plurality of ribs 120 arranged between first side wall 50 and vent 70 and a second plurality of ribs 122 arranged between second wall 52 and vent 70. In a non-limiting example, first plurality of ribs 120 and second plurality of ribs 122 include a generally circular cross-section and are arranged in rows that create intersecting flow paths.

In a non-limiting example, first plurality of ribs 120 define a first plurality of passages 128 that extend between first side wall 50 and vent 70 and a second plurality of passages 130 that extend between third side wall 54 and fourth side wall 56. First plurality of passages 128 and second plurality of passages 130 extend between adjacent ones of the first plurality of ribs 90 and intersect at a substantially perpendicular angle. Similarly, second plurality of ribs 122 define a third plurality of passages 133 that extend between second side wall 52 and vent 70 and a fourth plurality of passages 135 that extend between third side wall 54 and fourth side wall 56. Second plurality of passages 133 and fourth plurality of passages 135 extend between adjacent ones of the second plurality of ribs 92 and intersect at a substantially perpendicular angle.

In a non-limiting example, each of the first plurality of ribs 90 and the second plurality of ribs 92 includes an upper or support surface 137. Electrode stack 74 rests on support surface 137 of each of the first plurality of ribs 90 and the second plurality of ribs 92. In an alternative non-limiting example, a plastic sheet 110 is arranged on each support surface 137. Plastic sheet 110 includes a planar surface (not separately labeled) that eliminates stress concentrations that may occur when electrode stack 74 is supported directly on the plurality of raised ribs 117. The raised ribs 84 provide a platform that lifts electrode stack 74 from second wall 48 to provide clear pathways that allow gases that may develop in cell can 44 to vent to ambient.

At this point, it should be understood that the raised ribs in accordance with the disclosed non-limiting example, create pathways that improve venting of gases that may pass from the electrode stack during cycles of charging and discharging. The enhanced venting also aids in temperature reduction and gas discharge in the event that electrode stack overheats or experiences a thermal overload.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A battery cell for a vehicle comprising:

a cell can including a first wall, a second wall disposed opposite the first wall, a first side wall extending between and connecting the first wall with the second wall, and a second side wall, positioned opposite the first side wall extending between and connecting the first wall with the second wall, the first wall, the second wall, the first side wall, and the second side wall defining an electrode stack receiving zone;

a vent formed in the second wall, the vent being spaced from the first side wall and the second side wall, the vent fluidically connecting the electrode stack receiving zone with an exterior of the cell can; and an electrode stack positioned in the electrode stack receiving zone, the electrode stack being spaced from of the first side wall by a channel, wherein the cell can includes a plurality of raised ribs formed in the second wall, each of the plurality of raised ribs including a support surface, the electrode stack resting on the support surface in the electrode stack receiving zone.

2. The battery cell according to claim 1, wherein the plurality of raised ribs includes a first plurality of ribs formed in the second wall and extending between the first side wall and the vent and a second plurality of ribs formed in the second wall between the second side wall and the vent.

3. The battery cell according to claim 1, wherein each of the plurality of raised ribs includes a rectangular cross-section.

4. The battery cell according to claim 1, wherein each of the plurality of raised ribs includes a circular cross-section.

5. The battery cell according to claim 1, wherein each of the plurality of raised ribs includes a plurality of raised bumps formed in the second wall.

6. The battery cell according to claim 1, further comprising a plurality of passages extending between the first side wall and the vent, the plurality of passages being formed from the plurality of raised ribs.

7. The battery cell according to claim 6, further comprising a channel extending between the electrode stack and the first side wall, the channel being fluidically connected with the plurality of passages.

8. The battery cell according to claim 6, wherein the plurality of passages includes a first plurality of passages extending between the first side wall and the vent and a second plurality of passages extending substantially perpendicularly to the first plurality of passages.

9. The battery cell according to claim 1, wherein the plurality of raised ribs includes a first plurality of ribs formed in the second wall establishing a first plurality of passages extending between the first side wall and the vent and a second plurality of ribs formed in the second wall establishing a second plurality of passages extending between the second side wall and the vent.

10. The battery cell according to claim 1, further comprising a plastic support member arranged between the electrode stack and the support surface.

11. A vehicle comprising:

a body;

an electric motor supported in the body; and a battery pack supported in the body and connected to the electric motor, the battery pack including a battery cell comprising:

a cell can including a first wall, a second wall disposed opposite the first wall, a first side wall extending between and connecting the first wall with the second wall, and a second side wall, positioned opposite the first side wall extending between and connecting the first wall with the second wall, the first wall, the second wall, the first side wall, and the second side wall defining an electrode stack receiving zone;

a vent formed in the second wall, the vent being spaced from the first side wall and the second side wall, the vent fluidically connecting the electrode stack receiving zone with an exterior of the cell can; and an electrode stack positioned in the electrode stack receiving zone, the electrode stack being spaced from of the first side wall by a channel, wherein the cell can includes a plurality of raised ribs formed in the second wall, each of the plurality of raised ribs including a support surface, the electrode stack resting on the support surface in the electrode stack receiving zone.

12. The vehicle according to claim 11, wherein the plurality of raised ribs includes a first plurality of ribs formed in the second wall and extending between the first side wall and the vent and a second plurality of ribs formed in the second wall between the second side wall and the vent.

13. The vehicle according to claim 11, wherein each of the plurality of raised ribs includes a rectangular cross-section.

14. The vehicle according to claim 11, wherein each of the plurality of raised ribs includes a circular cross-section.

15. The vehicle according to claim 11, wherein each of the plurality of raised ribs includes a plurality of raised bumps formed in the second wall.

16. The vehicle according to claim 11, further comprising a plurality of passages extending between the first side wall and the vent, the plurality of passages being formed from the plurality of raised ribs.

17. The vehicle according to claim 16, further comprising a channel extending between the electrode stack and the first side wall, the channel being fluidically connected with the plurality of passages.

18. The vehicle according to claim 16, wherein the plurality of passages includes a first plurality of passages extending between the first side wall and the vent and a second plurality of passages extending substantially perpendicularly to the first plurality of passages.

19. The vehicle according to claim 11, wherein the plurality of raised ribs includes a first plurality of ribs formed in the second wall establishing a first plurality of passages extending between the first side wall and the vent and a second plurality of ribs formed in the second wall establishing a second plurality of passages extending between the second side wall and the vent.

20. The vehicle according to claim 11, further comprising a plastic support member arranged between the electrode stack and the support surface.

* * * * *